United States Patent
Gemello et al.

(10) Patent No.: US 11,378,129 B2
(45) Date of Patent: Jul. 5, 2022

(54) WHEEL BEARING ASSEMBLY WITH INTEGRATED SEAL

(71) Applicant: Aktiebolaget SKF, Gothenburg (SE)

(72) Inventors: Marco Gemello, Nichelino (IT); Giorgio Missiaggia, Piscina (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/126,808

(22) Filed: Dec. 18, 2020

(65) Prior Publication Data

US 2021/0206201 A1 Jul. 8, 2021

(30) Foreign Application Priority Data

Jan. 2, 2020 (IT) .................. 102019000024670

(51) Int. Cl.
*F16C 33/78* (2006.01)
*B60B 27/00* (2006.01)
(Continued)

(52) U.S. Cl.
CPC ...... *F16C 33/7893* (2013.01); *B60B 27/0073* (2013.01); *F16C 33/3831* (2013.01);
(Continued)

(58) Field of Classification Search
CPC .............. F16C 33/3806; F16C 33/3831; F16C 33/416; F16C 33/7823; F16C 33/783; F16C 33/7893; F16C 2326/02; B60B 27/0073

See application file for complete search history.

(56) References Cited

U.S. PATENT DOCUMENTS 3,524,237 A * 8/1970 Elmore .................. F16C 33/761
29/898.067
2006/0153484 A1* 7/2006 Ohata .................. F16C 33/7823
384/484
(Continued)

FOREIGN PATENT DOCUMENTS

DE 2753340 5/1979
DE 3738529 10/1988
(Continued)

OTHER PUBLICATIONS

Machine Translation of JP 2009-073252 (Year: 2009).*
(Continued)

*Primary Examiner* — Alan B Waits
(74) *Attorney, Agent, or Firm* — Reed Smith LLP

(57) ABSTRACT

Wheel bearing assembly for motor vehicles, the assembly being provided with a wheel hub and a bearing unit in turn provided with a radially outer ring and at least one radially inner ring provided, respectively, with a first raceway and at least one second raceway, with at least one row of rolling bodies arranged between the radially outer ring and the at least one radially inner ring, and with a cage for containing the at least one row of rolling bodies; the wheel bearing assembly is moreover provided with sealing means integrated in the cage and provided with at least two radial contact lips made of elastomeric material, with at least one first radial lip in contact with the radially inner ring and with at least one second radial lip in contact with the radially outer ring.

14 Claims, 3 Drawing Sheets

(51) Int. Cl.
*F16C 33/38* (2006.01)
*F16C 33/41* (2006.01)
(52) U.S. Cl.
CPC ........ *F16C 33/783* (2013.01); *F16C 33/7823* (2013.01); *F16C 33/3806* (2013.01); *F16C 33/416* (2013.01); *F16C 2326/02* (2013.01)

(56) References Cited

U.S. PATENT DOCUMENTS

2006/0177167 A1* 8/2006 Tsujimoto ........... F16C 33/7896
 384/486
2010/0201078 A1* 8/2010 Kuzumaki ........... F16J 15/3232
 277/560

FOREIGN PATENT DOCUMENTS

| FR | 3001781 | 8/2014 |
| FR | 3015600 | 6/2015 |
| JP | 2009073252 | 4/2009 |

OTHER PUBLICATIONS

Machine Translation of DE 3738529 (Year: 1988).*
International Search Report for corresponding Italy Patent Application No. 102019000024670 dated Sep. 30, 2020.

* cited by examiner

WHEEL BEARING ASSEMBLY WITH INTEGRATED SEAL

CROSS REFERENCE OF RELATED APPLICATION

This application is based on and claims priority to Italian Application No. 102019000024670, filed Jan. 2, 2020, under 35 U.S.C. § 119, the entire contents of which are incorporated herein by reference.

TECHNICAL FIELD

The present invention relates a wheel bearing assembly provided with a bearing unit, in turn comprising a pair of rolling bearings, for rotatably supporting a wheel of a vehicle mounted on a suspension.

BACKGROUND

A wheel bearing assembly provided with a bearing unit for rotatably supporting a wheel of a vehicle on a suspension is known and commonly used. The bearing unit generally includes a pair of rolling bearings.

BRIEF DESCRIPTION OF THE DRAWINGS

The invention will now be described with reference to the accompanying drawings which illustrate a non-limiting example of embodiment thereof, in which.

DETAILED DESCRIPTION

A wheel bearing assembly comprises a rotatable hub provided with a coupling for engaging a rotating element of the motor vehicle. For example, such rotating elements may include a wheel or a disc of a braking element, while the bearing unit comprises an outer ring, a pair of inner rings, one of which may be the hub itself, and a plurality of rolling bodies, e.g., balls, rollers or tapered rollers. All of these components have an axial symmetry with respect to the axis of rotation of the rotating elements, for example the hub and the inner rings of the bearing unit.

In view of an increasingly greater global competition of improved performance features of the wheel bearing assembly, cost-related aspects of these wheel bearing assemblies have also become of primary importance for manufacturers of such assemblies. Relatedly, in particular, during the last few years there has been a growing interest in polymeric materials and co-moulding processes.

To address performance needs expressed by purchasers and users of wheel hub bearing assemblies, who consider sealing performance to be one of the key performance features of an entire wheel bearing unit, disclosure addresses and meets these sealing requirements in current seal designs, by moulding elastomeric lips of sealing means directly onto a cage containing rolling bodies. Accordingly production costs are drastically reduced, and bearing and seal compactness is greatly improved while also reducing friction of a resulting bearing unit.

No effective seal integrated together with a cage are known on the market. Accordingly, there exists a need to define a suitable solution for a wheel bearing assembly in which integration of a sealing means with or in a cage of a bearing unit does enhances key performance indicators identified in the market while avoiding aforementioned drawbacks.

In particular, the subject matter of this disclosure relates to integration of at least one sealing device with a bearing unit, i.e., an axially inner seal and/or an axially outer seal, so as to be integrally joined together with a cage for containing rolling bodies of a bearing unit.

The solutions described herein may be applied to all generations of wheel bearing assemblies, provided that they have sealing devices and cages. In particular, such applications include both cases where an outer ring of a bearing is rotatable, while an inner rings of a bearing is fixed, and an opposite case where an inner ring rotates and an outer ring is fixed. Embodiments in accordance with this disclosure are suitable for any type of rolling body (balls, rollers, tapered rollers, etc.).

Various embodiments in accordance with this disclosure include a motor vehicle having a wheel bearing assembly provided with integrated sealing device and cage device.

By way of a non-limiting examples, various embodiments will now be described with reference to a wheel bearing assembly for motor vehicles which is provided with a bearing unit.

Figure 1:
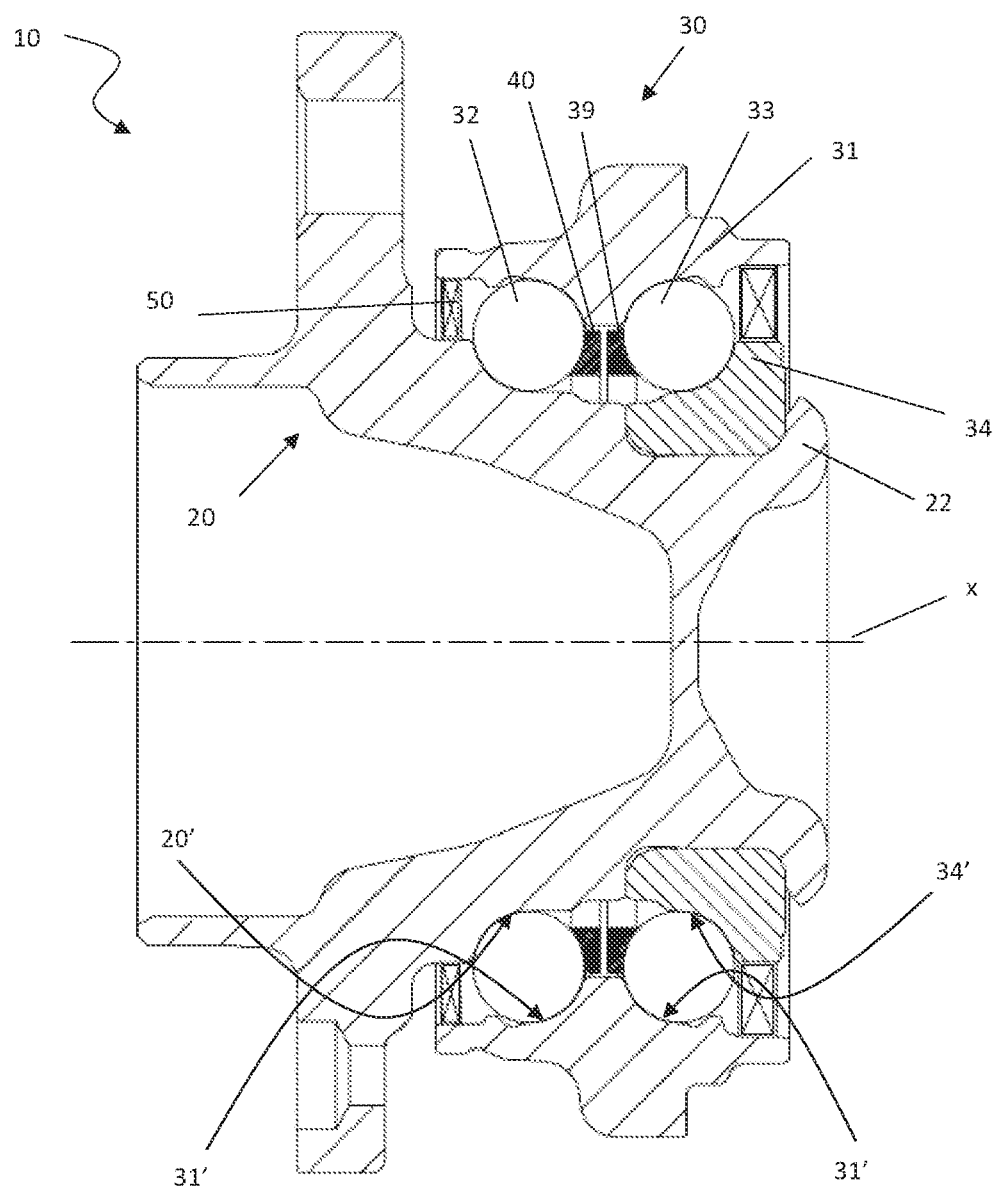
FIG. 1 is a cross-section through a wheel hub assembly provided with a bearing unit according to an aspect of the present invention.

With reference to FIG. 1, 10 denotes in its entirety a wheel bearing assembly according to an embodiment. The figure shows a detail of an exemplary configuration.

In the exemplary configuration shown, a wheel bearing assembly 10 has a central axis of rotation X and comprises a wheel hub 20 which is preferably, but not necessarily, rotatable, and a bearing unit 30 in turn comprising a radially outer ring 31, which is preferably, but not necessarily, stationary; a radially inner ring 20 defining a hub; a second radially inner ring 34 mounted rotatable on and integral with the hub 20; two rows of rolling bodies 32, 33, in this example balls, arranged between the radially outer ring 31 and the radially inner rings 20 and 34; and two cages 39, 40 for containing the rolling bodies so as to keep in position the rolling bodies of the rows of rolling bodies 32, 33. While this exemplary configuration is relied upon by this disclosure to illustrate various aspects, one will appreciate upon reading this disclosure in its entirety that embodiments of this invention may be employed to improve key performance indicators in many different wheel hub configurations.

As used herein, terms and the expressions indicating positions and orientations such as "radial" and "axial" are understood in reference to a central axis of rotation X of a bearing unit, e.g., 30. Expressions such as "axially outer" and "axially inner" instead relate to an assembled condition of a wheel bearing assembly, e.g., to a wheel side and to a side opposite to the wheel side respectively.

A radially outer ring 31 is provided with two respective radially outer raceways 31', while radially inner rings 20, 34 are provided with respective radially inner raceways 20', 34' for allowing rolling of an axially outer row of rolling bodies 32 arranged between radially outer ring 31 the hub 20, and an axially inner row of rolling bodies 33 between radially outer ring 31 and radially inner ring 34. For the sake of simpler graphical illustration reference numbers 32, 33 will be attributed both to individual balls and to corresponding rows of balls. Again for the sake of simplicity, "ball" may be used by way of example in the present description and in the attached drawings instead of the more generic term "rolling body" (and likewise the same reference numbers will be used) which encompasses rolling bodies other than ball-type bodies and which are fully encompassed by the scope of subject matter described herein.

Hub 20 defines at its axially inner end a rolled edge 22 which is configured to prestress axially an inner ring 34.

A wheel bearing assembly 10 may also be provided with sealing means 50 for sealing off a bearing unit from an external environment. From this point of view, FIG. 1 is to be regarded as being purely schematic, where integration of the sealing means 50 together with cages 39, 40 will be shown in detail in following figures. Sealing means 50 may be indicated below more simply as seals 50, obviously understood as referring to the same component.

Figure 2:
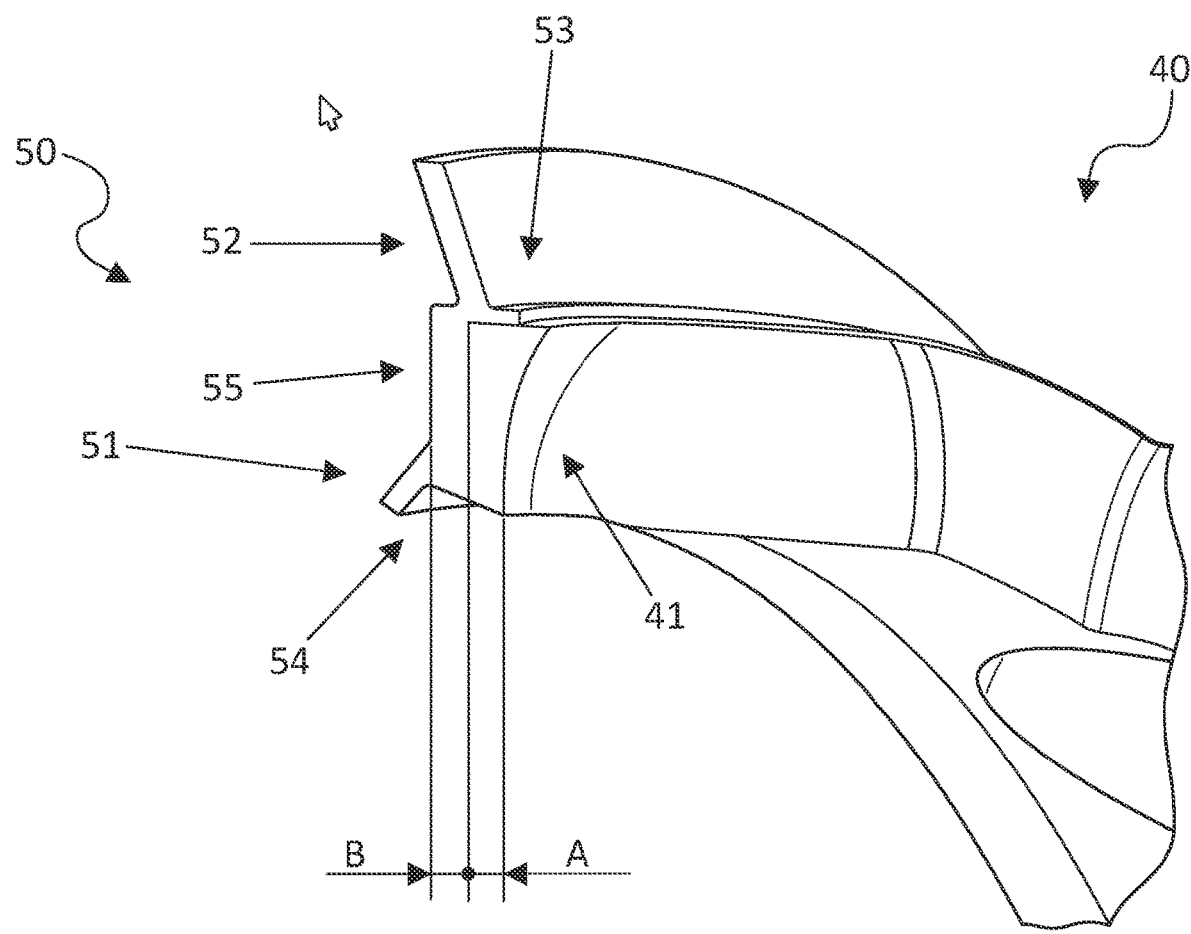
FIG. 2 is a detail, on a larger scale, of the wheel bearing assembly according to FIG. 1 and shows in schematic form the integration of sealing means in the cage containing the rolling bodies.

FIG. 2 is a detail, on a larger scale, of an exemplary wheel bearing assembly according to FIG. 1 and shows in schematic form an integration of at least one sealing means 50 in at least one cage, e.g., cage 40, containing rolling bodies, which may be rolling bodies 32, 33. In some embodiments, as illustrated, seal 50 includes two radial contact lips 51, 52 made of elastomeric material, as well as a top portion 53, a bottom portion 54 and front portion 55 which represent portions making contact between seal 50 and cage 40.

Correct operation of the sealing means 50 is ensured by two radial contact lips 51, 52, one of which acts on a radially inner ring of a bearing (e.g., hub 20), and another one of which acts on a radially outer ring 31. It should be pointed out that a number of lips is not necessarily limited to two, i.e., this number may also be greater, but what is important is that at least some lips should have a practically radial type progression. In fact, in a case with two lips or more lips, for at least two lips as illustrated a radial progression of lips 51, 52 is indispensable for compensating for deformations under load of rings of a bearing unit and any associated axial play between a cage 40, together with integrated seal 50 and lips 51, 52, and rolling bodies, e.g., 32. Moreover, during assembly of a bearing unit, it is easier to avoid inversion of lips, e.g., 51, 52, since the lips are inclined in the typical direction of assembly of a cage inside a radially outer ring and then of coupling of the latter together with the radially inner ring.

In terms of sealing performance, direct exposure of lips to contaminants may be further improved by implementing different static labyrinth devices owing to greater compactness provided by integration of sealing means 50 in or with cage 40.

Another important aspect is geometry of a cage, e.g., cage 40. As can be seen in FIG. 2, a cage 40 has a support portion 41 on which lips 51, 52 are co-moulded and this support portion 41 must be located practically coinciding with a circumference which encloses centres of the rolling bodies 32 so as to reduce dynamic effects on lips due to rotation. In other words a centre of gravity of a support portion 41 of a cage 40, onto which the lips 51, 52 are co-moulded, must be approximately on a same nominal pitch diameter as that of rolling bodies, e.g., 32 (the diameter in which rolling bodies are positioned with respect to an axis of symmetry, e.g., axis of symmetry X, of a bearing unit). Basically, support portion 41 must be aligned as far as possible with a centre of gravity of rolling bodies 32. In this way, having defined a radial configuration of lips, a centre of gravity thereof may be kept closer to a support portion 41 of a cage 40.

This aspect improves overall rigidity of cage, e.g., 40, with co-moulded lips, e.g., 51, 52, since the latter operate centred with respect to rolling bodies and not offset towards one of the two rings of a bearing unit, e.g., 10. Moreover, this centred positioning of lips, e.g., 51, 52 also reduces flexural stressing effects which occur during use, during which cages tends to become deformed owing to moments that acting on a bearing unit.

In this way, namely by ensuring that lips 51, 52 have a practically radial progression and that their extension starts from support portion 41 aligned with a centre of gravity of rolling bodies 32, an important result is obtained that lengths of the lips 51, 52 will be practically equal to half a length of a sealing lip according to known solutions which extends entirely within a space existing between radially inner ring and radially outer ring. This halving of a length of the lip results in further advantages, as clarified below.

Design of lips 51, 52 accounts for a number of parameters reflecting performance requirements. Firstly, a radial space available between a radially inner ring 20 and a radially outer ring 31. Typically a relative speed of a cage and rings of a bearing unit is practically equal to half that which exists between radially inner ring and radially outer ring. For this reason, e.g., two radial contact lips 51, 52 will have a same length in a radial direction and an interference with corresponding surfaces of radially inner rings 20 and radially outer ring 31 which is variable between 0.3 mm and 0.5 mm, e.g., in some embodiments is equal to 0.4 mm.

Moreover, depending on the nominal contact angle of rolling bodies, relative speeds of respective lips and rings change, resulting in a different wear of said lips. Accordingly, such lips may be configured to have different thicknesses, preferably within the range 0.1 mm-0.6 mm. It should be noted that a "length" of a lip is understood as meaning a dimensioned obtained by taking as reference point for a measurement a theoretical point where a centre of gravity of the support portion 41 of the cage 40 is located and extending to an extent of a lip.

A suitable definition of these latter parameters (thickness and length of lips) depends also on a deformation under load of inner and outer rings and of a cage. Following the combination of radial and axial loads on a bearing unit, deformations of radially inner rings and radially outer rings are different, since geometric and constraint conditions of such rings are different. This requires a different flexibility of lips in embodiments which may be controlled by optimizing a thickness of said lips, a distance of a contact point from a support portion, e.g., 41 of a cage, e.g., 40, a length of said lips and their bending cross-section. If a ratio between a length of the bottom radial lip 51 and a length of the top radial lip 52 is defined as the ratio R, preferably this ratio will be comprised within the range 0.5-2 depending on a nominal contact angle of respective rolling bodies. This means that a lip which must compensate for a greater deformation on an associated rotating ring may be up to twice as long as (and therefore more flexible than) another lip which acts on a stationary ring.

Figure 3:
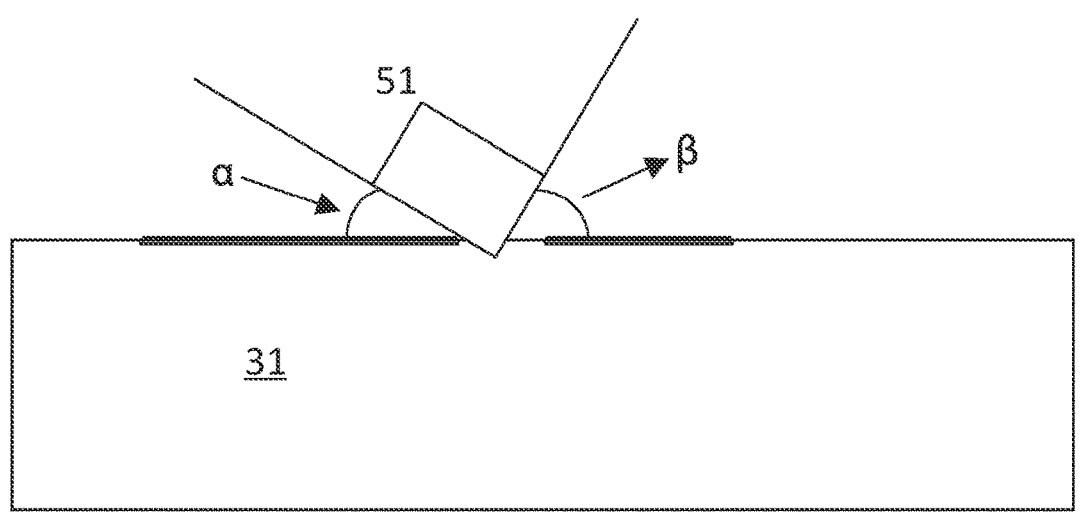
FIG. 3 shows in schematic form the contact zone of a lip of the sealing means on the surface of the radially outer ring of the bearing unit.

With reference to FIG. 3, which shows in schematic form the contact zone of one lip 51 of the sealing means 50 on the surface of the radially outer ring 31, in the applications for wheel hub assemblies, in order to optimize the required sealing performance, the lips have asymmetrical angles of the frictional contact zone in order to optimize and ensure a uniform contact pressure on the said lips. In particular, the angle α towards the bearing unit is between 20° and 35°, while the angle β in the direction of entry of mud ranges between 40° and 70°.

Since a radial length of each single lip is equal to about half the length of a respective lip used in known seals according to the prior art, the lips 51, 52 according to the invention have a greater rigidity. In fact, since thicknesses of the lips 51, 52 is practically equivalent to that of the lips according to the prior art, slenderness (length/thickness ratio) of lips according to various embodiments, e.g., 51, 52 is equal to about half that of known lips in known embodiments. For this reason, a distribution of contact pressure is such that it is possible to reduce the nominal values of the angles α and β indicated in FIG. 3 by about 10%, while maintaining asymmetry of said angles: this asymmetry of angles has the function of "presenting" to the incoming mud (or other debris) a positive pressure gradient.

Moreover, since cages along production lines of wheel bearing assemblies are assembled by positioning them within a radially outer ring and since the latter with the cages is coupled together with radially inner ring or rings, embodiments in accordance with this disclosure, considering a smaller slenderness of the lips 51, 52, the angle of inclination (with respect to the perpendicular of the working surface) of a single lip may be reduced down to 20°, without negatively affecting rigidity (and therefore contact pressure) of the said lip. Moreover, reducing an angle of incidence of a lip results in advantages in terms of uniformity of contact pressure and consequently wear.

Figure 4:
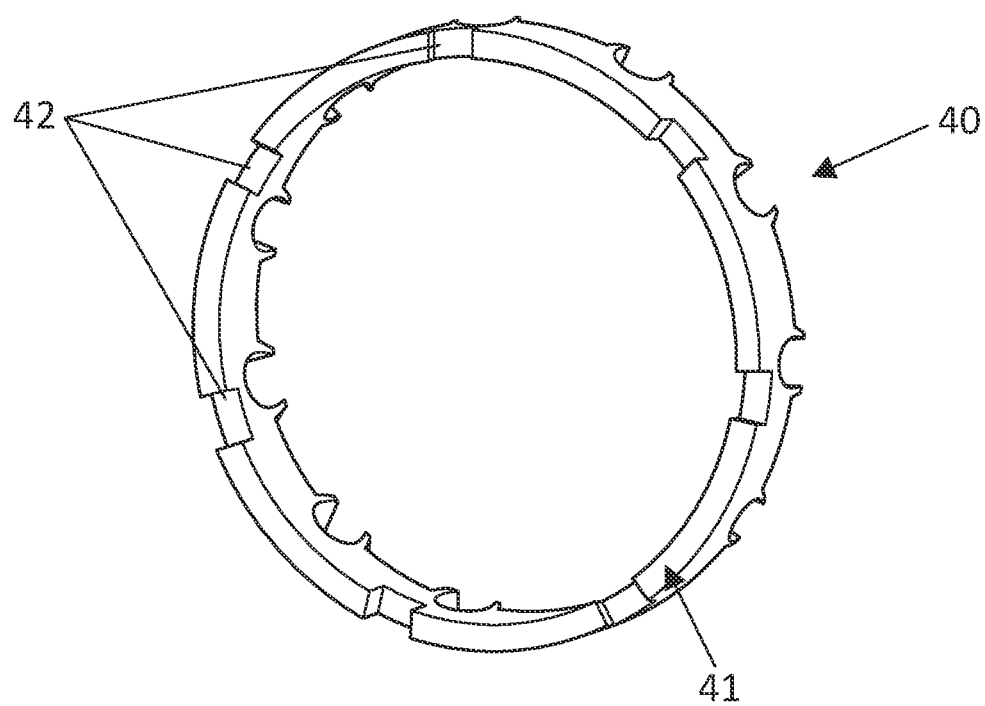
FIG. 4 shows the cage and in particular a support portion on which the sealing means is co-moulded.
Figure 5:
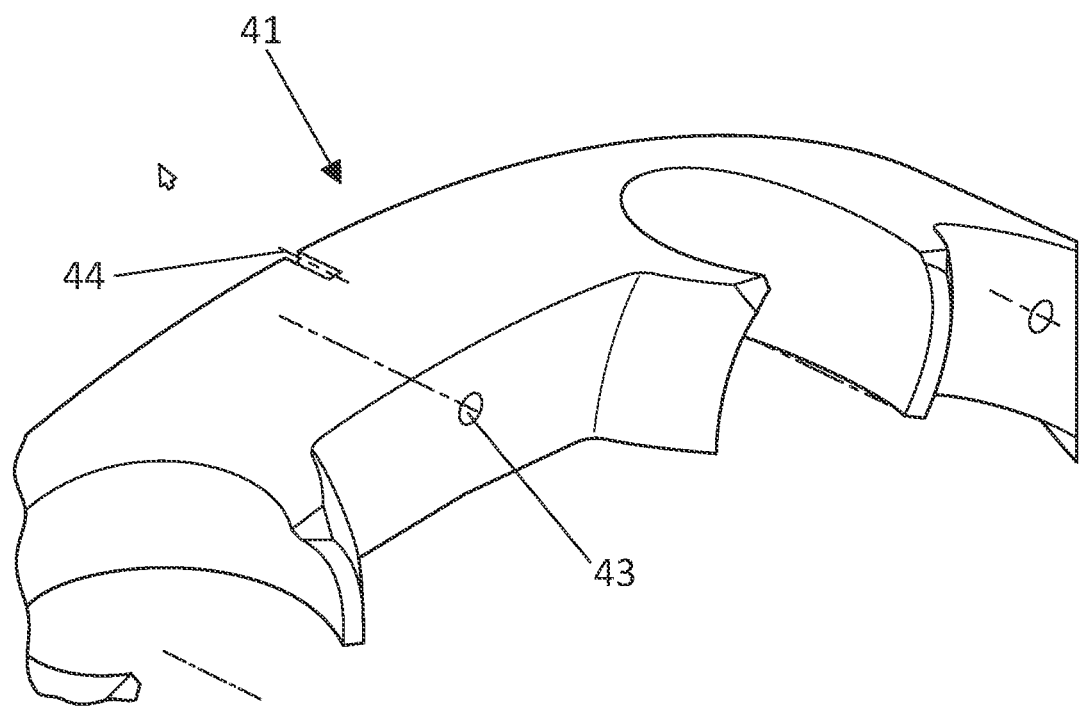
FIG. 5 shows a detail, on a larger scale, of the support portion of the cage according to FIG. 4.

With reference to FIGS. 4 and 5 which show respectively the cage 40 and in particular the support portion 41 (FIG. 4) and a detail on a larger scale of the support portion 41 of the cage 40 (FIG. 5), a number of constructional details of this support portion may be seen. Firstly, it has openings 42 arranged discontinuously along its surface in the circumferential direction. The openings 42 have the function of introducing the elastomeric material of the lips inside the cage 40 in order to improve adhesion. Preferably, the area of the openings 42 must not exceed 20% of the surface of the support portion 41, so as not to weaken the structure of the cage. Moreover, the support portion 41 includes a plurality of crimping holes 43 and grooves 44 which are specially made in order to improve also the adhesion of the elastomeric material of the lips 51, 52 on the polymeric material of the cage 40. The size of the crimping holes 43 is optimized depending on the viscosity of the elastomeric material injected during the co-moulding operation.

As regards the most suitable materials for making a sealing means integrated in or with a cage it should be noted that thermoplastic elastomers, while they have a good processing capacity, have a number of drawbacks from the point of view of performance. In fact, thermoplastic materials are relatively easy to use during production, for example by means of injection-moulding. But, since they do not have an internal reticular structure (such as vulcanized rubbers, for example), they have a poor ageing resistance which results in an unsatisfactory wear resistance of resulting lips.

Therefore it is preferred to use preferred solutions which have a satisfactory process/performance trade-off. Such solutions consist of vulcanized thermoplastic polymers which form part of the family of thermoplastic elastomer polymers, but which have elastomeric properties more similar to those of synthetic thermosetting rubber, combining the performance characteristics of vulcanized rubber (in particular excellent elasticity and wear resistance) with the processing properties of thermoplastic materials. Vulcanized thermoplastic polymers are an alloy formed mainly by synthetic rubber particles which are completely vulcanized and encapsulated in a polypropylene matrix.

An alternative solution consists in using nitrile butadiene. In this case it will be even more important to provide sufficient adhesion means (holes, grooves) in the support portion of the cage in order to improve the mechanical fixing characteristics.

Independently of the material used, a cage with an integrated seal must be able to operate correctly up to a reference temperature of 80° C. for all applications of a wheel bearing assembly in accordance with this disclosure. In this connection, it should be pointed that, by using vulcanized thermoplastic polymers as a material for the sealing lips, the thermal expansion coefficient of the lips 51, 52 will be fairly close to that of the support portion 41 of the cage 40, which is made of plastic material.

The co-moulding process may be performed using different methods. Depending on the different injection temperature of the plastic and rubber moulding, according to a first method, the cage is first moulded and then the elastomeric material of the lips is made to adhere to the cage owing to the effect of the temperature and the chemical affinity. Should this solution not be possible owing to the too high injection temperature required for the elastomeric material (which temperature would cause overheating of the cage itself), the co-moulding process may be reversed by injecting first the elastomeric material and then the plastic material. The function of the chemical affinity which allows adhesion between the two materials may also be assisted by mechanical fixing means which join together the two components.

For optimal implementation of the co-moulding process it is necessary for a cage, e.g., 40 to have a sufficiently rigid structure: this is obtained by ensuring that the material of the cage completely surrounds the rolling bodies or by making the support portion 41 in a sufficiently rigid manner. Moreover, a thickness A of a support portion 41 must be comprised within the range of 3 mm and 6 mm, whereby it may be continuous or intermittent (owing to the presence of the openings 41) over the entire 360°, but in any case in such a way as to avoid substantial displacement of the lips during the operating conditions under load. Good results in terms of co-moulding and operational efficiency during the application are obtained by keeping the relative ratio of thickness A of the support portion 41 and thickness B of the lips 51, 52 in the zone of contact with the cage (see again FIG. 2) within the range of between 50% and 80%, while keeping the thickness B not less than 0.4 mm. The length of the radial lips 51, 52 may vary between 1 mm and 5 mm and preferably the lengths of the two lips may be equal to each other, as well as being, as already mentioned, equal to about half of the length of a sealing lip made using the known technology, namely not integrated in the cage.

The number of interfaces between the seal 50 and the cage 40 may be variable from 1 to 3. In the example of FIG. 2, the interfaces are three in number and are present precisely in the top portion 53, in the bottom portion 54 and in the front portion 55 which represent the portions making contact between the seal 50 and the cage 40.

The advantages obtained by the integration of the sealing lips in the cage are associated with reduction of the costs owing to removal of the metal supports for the lips. Furthermore, co-moulding of the elastomeric material of the seal onto the plastic material of the cage is a reliable and low-cost process. Further advantages include: savings in terms of weight and costs owing to the reduced axial space of the rings, since the sealing zone is reduced; greater flexibility for the design of the rows of rolling bodies, since there is a greater distance between the said rows, while maintaining the same interfaces; greater axial compactness of the wheel bearing assembly; potential reduction of the friction due to the different sliding speed of the sealing lips; reduction of the friction of the rows of rolling bodies due to the increased distance between the said rows, and the greater duration and rigidity of the rows of rolling bodies; less wear of the sliding surfaces owing to the lower relative speed of the sealing lips and contact surfaces of the rings; smaller number of parts to be provided and assembled on the production line; less wear of the lips since, for the same contact pressure, the relative sliding speed with respect to the surfaces of the rings is lower (as seen, about half) and the overall deformation acting on the single lip is less since the distance between the cage and rings is less than that between radially inner ring and radially outer ring. Therefore, also the expected duration of the sealing lips is greater and the metal supports to be assembled on the rings in order to ensure correct operation of the lips are no longer necessary.

Finally, it should be pointed out that friction-related performance characteristics are better than or at least equivalent to those of the known solutions. In fact, if on the one hand, the contact surface increases (the friction is proportional to the square of the diameter of the contacting lip), on the other hand the relative speed of the parts is halved (approximately).

The object of the present invention is to provide a wheel bearing assembly provided with at least one sealing means integrated in at least one cage for containing the rolling bodies.

The sealing means will be provided with at least two contact sealing lips which will have a radial extension with respect to the axis of symmetry of the bearing unit so as to compensate for the relative displacement of the cage in which they are integrated and the rolling bodies. The two radial lips will contact respectively the radially outer ring and the radially inner ring of the bearing unit.

Preferably, the cage containing the rolling bodies will have a support portion in which the lips of the sealing means are integrated and the centre of gravity of the support portion must be positioned approximately along the same diameter on which the rolling bodies are positioned with respect to the axis of symmetry of the bearing.

Therefore, according to the present invention a wheel bearing assembly is provided, in which at least one cage containing the rolling bodies is provided with an integrated seal, the wheel bearing assembly having the characteristic features indicated in the independent claim attached to the present description.

Further preferred and/or particularly advantageous embodiments of the invention are described in accordance with the characteristic features indicated in the attached dependent claims.

In addition to the embodiment of the invention, as described above, it must be understood that numerous other variants exist. It must also be understood that these embodiments are only examples and limit neither the scope of the invention, nor its applications, nor its possible configurations. On the contrary, although the description above allows the person skilled in the art to implement the present invention at least according to one of its examples of embodiment, it must be understood that many variants of the components described are possible, without thereby departing from the scope of the invention, as defined in the accompanying claims, which are interpreted literally and/or in accordance with their legal equivalents.

The invention claimed is:

1. A wheel bearing assembly for motor vehicles, the assembly comprising a wheel-hub and a bearing unit in turn comprising:
    a radially outer ring and at least one radially inner ring provided, respectively, with a first raceway and at least one second raceway;
    at least one row of rolling bodies arranged between the radially outer ring and the at least one radially inner ring; and
    a cage for containing the at least one row of rolling bodies; and
    a seal integrated in the cage and provided with at least two radial contact lips made of elastomeric material, with at least one first radial lip in contact with the radially inner ring and with at least one second radial lip in contact with the radially outer ring,
    wherein the cage has a support portion on which the at least two radial lips are co-moulded and a centre of gravity of the support portion is positioned approximately on the same nominal pitch diameter of a rolling body, wherein the nominal pitch diameter is the diameter in which a center of the rolling body of the at least one row of rolling bodies is positioned with respect to an axis (X) of symmetry of the bearing unit, and
    wherein the support portion has a plurality of openings disposed in a discontinuous manner in a circumferential direction, a plurality of crimping holes and a plurality of grooves made to improve adhesion of an elastomeric material of the at least two radial contact lips on the cage.

2. The wheel bearing assembly according to claim 1, wherein the at least two radial lips are made of vulcanized thermoplastic polymeric material.

3. The wheel bearing assembly according to claim 1, wherein the at least two radial lips have substantially the same length in a radial direction comprised in a range between 1 mm and 5 mm.

4. The wheel bearing assembly according to claim 1, wherein the at least two radial lips have an interference with the corresponding surfaces of the radially inner ring and radially outer ring, the interference extending between 0.3 mm and 0.5 mm over the corresponding surfaces.

5. The wheel bearing assembly according to claim 1, wherein the at least two radial lips have a thickness ranging between 0.1 mm and 0.6 mm.

6. The wheel bearing assembly according to claim 1, wherein a thickness (A) of the support portion ranges between 3 mm and 6 mm.

7. The wheel bearing assembly according to claim 1, wherein a ratio between a thickness (A) of the support portion and a thickness (B) of the radial lips ranges between 50% and 80%.

8. A cage for containing at least one row of rolling bodies in a wheel hub assembly, comprising:
    a seal integrated in a cage, the seal provided with at least two radial contact lips, with at least one first radial lip configured to, when assembled in a wheel hub assembly, contact a radially inner ring and with at least one second radial lip configured to, when assembled in a wheel hub assembly, contact with a radially outer ring,
    wherein the cage has a support portion on which the at least two radial lips are co-moulded and wherein the cage is configured such that, when assembled in a wheel hub bearing, a centre of gravity of the support portion is positioned approximately on a same nominal pitch diameter of a rolling body, wherein the nominal pitch diameter is the diameter in which a center of the rolling body of a row of rolling bodies is positioned with respect to an axis (X) of symmetry of the wheel hub bearing, wherein a ratio between a thickness (A) of the support portion and a thickness (B) of a radial lip of the at least two radial lips ranges between 50% and 80%, and wherein the support portion has a plurality of openings disposed in a discontinuous manner in a circumferential direction, a plurality of crimping holes and a plurality of grooves made to improve adhesion of an elastomeric material of the at least two radial contact lips on the cage.

9. The cage of claim 8, wherein the at least two radial lips are made of a vulcanized thermoplastic polymeric material.

10. The cage of claim 8, wherein the at least two radial lips have substantially the same length in a radial direction comprised in a range between 1 mm and 5 mm.

11. The cage of claim 8, wherein the at least two radial lips have an interference with the corresponding surfaces of the radially inner ring and radially outer ring, the interference varying between 0.3 mm and 0.5 mm.

12. The cage of claim 8, wherein the at least two radial lips have a thickness ranging between 0.1 mm and 0.6 mm.

13. The cage of claim 8, wherein the thickness (A) of the support portion ranges between 3 mm and 6 mm.

14. A cage for containing at least one row of rolling bodies in a wheel hub assembly, comprising:

a seal integrated in a cage, the seal provided with at least two radial contact lips, with at least one first radial lip configured to, when assembled in a wheel hub assembly, contact a radially inner ring and with at least one second radial lip configured to, when assembled in a wheel hub assembly, contact with a radially outer ring, wherein the cage has a support portion on which the at least two radial lips are co-moulded and wherein the cage is configured such that, when assembled in a wheel hub bearing, a centre of gravity of the support portion is positioned approximately on a same nominal pitch diameter of a rolling body, wherein the nominal pitch diameter is the diameter in which a center of the rolling body of a row of rolling bodies is positioned with respect to an axis (X) of symmetry of the wheel hub bearing, wherein a ratio between a thickness (A) of the support portion and a thickness (B) of a radial lip of the at least two radial lips ranges between 50% and 80%, wherein the support portion has a plurality of openings disposed in a discontinuous manner in a circumferential direction, a plurality of crimping holes and a plurality of grooves made to improve adhesion of an elastomeric material of the at least two radial contact lips on the cage, wherein the at least two radial lips are made of a vulcanized thermoplastic polymeric material, wherein the at least two radial lips have substantially the same length in a radial direction comprised in a range between 1 mm and 5 mm, wherein the at least two radial lips have an interference with the corresponding surfaces of the radially inner ring and radially outer ring varying between 0.3 mm and 0.5 mm, wherein the at least two radial lips have a thickness ranging between 0.1 mm and 0.6 mm, and wherein the thickness (A) of the support portion ranges between 3 mm and 6 mm.

\* \* \* \* \*

UNITED STATES PATENT AND TRADEMARK OFFICE
CERTIFICATE OF CORRECTION

PATENT NO. : 11,378,129 B2
APPLICATION NO. : 17/126808
DATED : July 5, 2022
INVENTOR(S) : Marco Gemello It is certified that error appears in the above-identified patent and that said Letters Patent is hereby corrected as shown below:

In the Claims

1. In Column 8, Lines 21–24, change "on the same nominal pitch diameter of a rolling body, wherein the nominal pitch diameter is the diameter in which a center of the rolling body of the at least one row of rolling bodies" to --on the same nominal pitch diameter of the rolling bodies, wherein the nominal pitch diameter is the diameter in which a center of the rolling bodies of the at least one row of rolling bodies--.

2. In Column 8, Line 66–Column 9, Line 2, change "on the same nominal pitch diameter of a rolling body, wherein the nominal pitch diameter is the diameter in which a center of the rolling body of the at least one row of rolling bodies" to --on the same nominal pitch diameter of the rolling bodies, wherein the nominal pitch diameter is the diameter in which a center of the rolling bodies of the at least one row of rolling bodies--.

3. In Column 10, Lines 7–10, change "on the same nominal pitch diameter of a rolling body, wherein the nominal pitch diameter is the diameter in which a center of the rolling body of the at least one row of rolling bodies" to --on the same nominal pitch diameter of the rolling bodies, wherein the nominal pitch diameter is the diameter in which a center of the rolling bodies of the at least one row of rolling bodies--.

Signed and Sealed this
Twenty-fourth Day of September, 2024

Katherine Kelly Vidal
*Director of the United States Patent and Trademark Office*